United States Patent
Komoto

(10) Patent No.: US 6,270,416 B1
(45) Date of Patent: Aug. 7, 2001

(54) VIDEO GAME APPARATUS AND METHOD, AND STORAGE MEDIUM

(75) Inventor: Nobuaki Komoto, Honolulu, HI (US)

(73) Assignee: Square Co., Ltd., Tokyo (JP)

(*) Notice: Subject to any disclaimer, the term of this patent is extended or adjusted under 35 U.S.C. 154(b) by 0 days.

(21) Appl. No.: 09/426,197

(22) Filed: Oct. 25, 1999

(51) Int. Cl.[7] .............. A63F 13/00; A63F 9/24; G06F 17/00; G06F 19/00

(52) U.S. Cl. .................. 463/43; 463/44; 463/45; 463/1; 463/7; 463/8; 273/440.1; 273/460; 273/461

(58) Field of Search .................. 463/43, 36, 37, 463/38, 44, 45, 46, 47, 15, 1, 7, 8, 30, 31; 273/317.1, 440.1, 148 R, 148 B, 453, 454, 440, 460, 461, 459; 700/90, 91, 92; 345/418, 419

(56) References Cited

U.S. PATENT DOCUMENTS

| | | | |
|---|---|---|---|
| 4,657,247 | * | 4/1987 | Okada ................... 273/1 E X |
| 5,390,937 | * | 2/1995 | Sakaguchi et al. ........... 273/434 |
| 5,649,862 | * | 7/1997 | Sakaguchi et al. ........... 463/44 X |
| 5,766,077 | * | 6/1998 | Hongo ................... 463/30 X |
| 5,807,174 | * | 9/1998 | Fukuhara et al. ........... 463/31 |
| 5,931,734 | * | 8/1999 | Nakatani et al. ........... 463/23 |
| 6,007,428 | * | 12/1999 | Nishiumi et al. ........... 463/36 X |
| 6,009,458 | * | 12/1999 | Hawkins et al. ........... 709/203 X |
| 6,017,272 | * | 1/2000 | Rieder ................... 463/31 |
| 6,126,544 | * | 10/2000 | Kojima ................... 463/31 X |
| 6,132,315 | * | 10/2000 | Miyamoto et al. .......... 463/43 |
| 6,162,120 | * | 12/2000 | Takahashi et al. .......... 463/8 X |

* cited by examiner

Primary Examiner—Jessica J. Harrison
Assistant Examiner—Binh-An D. Nguyen
(74) Attorney, Agent, or Firm—Greenblum & Bernstein, P.L.C.

(57) ABSTRACT

A memory of a video game apparatus stores durability data and discipline degree data of weapon items and armor items possessed by a player character. When the player character makes an attack using an equipped weapon item in response to an operation inputted by a player, the durability of the corresponding weapon item is reduced. On the other hand, when the player character receives a damage greater than a preset magnitude due to an attack from an enemy character, the durability of an equipped armor item is reduced. When the durability of the weapon or armor item becomes "0", the weapon or armor item is changed to a preset different item according to the discipline degree of the former item at that time. Instead of the discipline data, change probability may be used for determining a new item which replaces the former item.

13 Claims, 11 Drawing Sheets

FIG. 3

| ITEM KIND (20a) | ITEM NAME (20b) | EQUIP FLAG F (20c) | ITEM DATA (20d) ||
|---|---|---|---|---|
| WEAPON | WOODEN CLAW | 1 | ATTACK POWER | 3 |
| | | | HIT RATE | 94 |
| | | | DURABILITY | 10 |
| | | | DISCIPLINE DEGREE | +3 |
| | FLAME CLAW | 0 | ATTACK POWER | 7 |
| | | | HIT RATE | 92 |
| | | | DURABILITY | 12 |
| | | | DISCIPLINE DEGREE | +8 |
| | ⋮ | ⋮ | ⋮ | ⋮ |
| ARMOR | WOODEN SADDLE | 1 | DEFENSE POWER | 3 |
| | | | EVASION RATE | 8 |
| | | | DURABILITY | 11 |
| | | | DISCIPLINE DEGREE | +1 |
| | HOLY SADDLE | 0 | DEFENSE POWER | 5 |
| | | | EVASION RATE | 7 |
| | | | DURABILITY | 21 |
| | | | DISCIPLINE DEGREE | +5 |
| | ⋮ | ⋮ | ⋮ | ⋮ |
| OTHERS | HI-POTION | RESTORES HP BY 100 || 3 |
| | THIEF'S KEY | KEY ITEM || 1 |
| | RUST CARD | REDUCES DURABILITY BY "10" || 2 |
| | POLISH CARD | INCREASES DISCIPLINE DEGREE BY "2" || 3 |
| | FIREBALL | INCREASES ATTACK POWER OF MAGIC "FIRE" || 1 |
| | MISS RATE DOWN | REDUCES MISS RATE BY 20 UPON ATTACK || 1 |
| | IFLEET | ALLOWS PLAYER TO CALL SUMMON MONSTER "IFLEET" || 1 |
| | ⋮ | ⋮ || ⋮ |

FIG.4

| ITEM<br>21a | DISCIPLINE<br>DEGREE<br>21b | CHANGING ITEM<br>21c | EFFECT<br>21d |
|---|---|---|---|
| WOODEN CLAW | +3~+7 | MISS RATE DOWN | REDUCES MISS RATE BY 20 UPON ATTACK |
|  | +8 OR GREATER | RESTORATION UP | INCREASES RESTORATION RATE BY 20% |
| FLAME CLAW | +2~+6 | FIREBALL | INCREASES ATTACK POWER OF MAGIC "FIRE" |
|  | +7 OR GREATER | IFLEET | ALLOWS PLAYER TO CALL SUMMON MONSTER "IFLEET" |
| FREEZING CLAW | +3~+9 | BLIZZARD STORM | INCREASES ATTACK POWER OF MAGIC "BLIZZARD" |
|  | +10 OR GREATER | SIVA | ALLOWS PLAYER TO CALL SUMMON MONSTER "SIVA" |
| WOODEN SADDLE | +3~+7 | HASTE | ALLOWS PLAYER TO USE MAGIC "HASTE" |
|  | +8 OR GREATER | RANDOM SUMMON | RANDOMLY CALLS SUMMON MONSTER |
| HOLY SADDLE | +5~+9 | MAGIC POWER UP | INCREASES MAGIC POWER BY 20% |
|  | +10 OR GREATER | HOLY | ALLOWS PLATER TO USE MAGIC "HOLY" |
| ...... | ...... | ...... | ...... |

FIG.10

| ITEM 22a | CHANGING ITEM 22b | CHANGE PROBABILITY 22c |
|---|---|---|
| WOODEN CLAW | RESTORATION UP | 50 % |
| FLAME CLAW | FIREBALL | 30 % |
| FREEZING CLAW | BLIZZARD STORM | 80 % |
| | SIVA | 20 % |
| WOODEN SADDLE | HASTE | 90 % |
| | RANDOM SUMMON | 10 % |
| HOLY SADDLE | MAGIC POWER UP | 90 % |
| | HOLY | 10 % |
| ⋮ | ⋮ | ⋮ |

VIDEO GAME APPARATUS AND METHOD, AND STORAGE MEDIUM

BACKGROUND OF THE INVENTION

1. Field of the Invention

The present invention relates to a video game, and more particularly, to a technique for controlling items which cause changes in progress of a video game played.

2. Description of the Related Art

There are various kinds of video games. In some of them, a player character operated by a player can obtain items during the game progress. The items cause changes in the game progress, and are set to differ per kind in contents of changes and effects influenced on the game progress.

For instance, in video games where a player character operated by a player fights an enemy character controlled by a computer, an item causes the following change onto the game progress:

Specifically, when the player inputs a command to use an item possessed by the player character, a parameter representing attack power, defense power, physical stamina or the like set for the player character is increased or decreased by a predetermined value, or the player character can implement a special attack or defense.

Other than those video games where the player character and the enemy character fight each other, such video games are available wherein a turning point of a game scenario or permission to proceed to the next game stage is controlled depending on whether or not the player character has a particular item.

In the video games, the player character normally obtains an item by buying it in a store, finding it on the game field, or winning it by clearing a predetermined event such as a battle with an enemy character. The obtained item is set to be owned by the player character.

The player selects an item to use from among items owned by the player character according to the state of the game progress. Then, depending on the selected item, the game progress is subjected to a corresponding change. Accordingly, the item is a factor for giving variation to the game progress to make the game more pleasant.

For enhancing the attractiveness of the video game wherein the items are obtainable during the game progress, it is desirable to improve a control manner with respect to generation, growth and extinction of the item.

SUMMARY OF THE INVENTION

Therefore, it is an object of the present invention to provide a video game wherein an item is changed to a different item according to the number of times of having used the former item.

According to one aspect of the present invention, there is provided a video game apparatus for playing a video game wherein a character is capable of possessing an item which causes a change in progress of the video game, the apparatus comprising first storage means for storing first items corresponding to second items, the first items each assigned the number of preset using times thereof by the character; second storage means for storing the number of used times of each of the first items possessed by the character; updating means for updating the number of used times of one of the first items possessed by the character stored in the second storage means when the one of the first items is used in response to an operation inputted by a player; judging means for judging whether the number of used times of the one of the first items updated by the updating means reaches the number of preset using times of the one of the first items; and changing means for changing the one of the first items to corresponding one of the second items stored in the first storage means when the judging means judges that the number of used times of the one of the first items reaches the number of preset using times of the one of the first items.

In the foregoing video game apparatus, when the item possessed by the character is used, the number of used times thereof is updated. Then, if the number of used times of the item reaches a predetermined value, the item is changed to a different item. Thus, depending on a frequency of using the item by the character during the progress of the game, the item possessed by the character is changed to a different item at a different time point or scene so that the attractiveness of the game can be enhanced.

Further, since an item has an attribute to cause a change in progress of a game, if the item is changed at a different time point or scene, the progress of the game can be diversified.

In the foregoing video game apparatus, it may be arranged that the game realizes a battle between the character and another character, and that the changing means changes the one of the first items to the corresponding one of the second items after the battle is finished.

In this case, the item is not changed during the battle between the characters. Thus, the attractiveness of the game is not spoiled, which would be otherwise spoiled due to a change of the item during the battle.

It may be arranged that the video game apparatus further comprises guidance display means which causes a guidance to be displayed when the changing means changes the one of the first items to the corresponding one of the second items, the guidance notifying a change of the one of the first items to the corresponding one of the second items.

It may be further arranged that the changing means determines whether to change the one of the first items to the corresponding one of the second items in accordance with a preset probability value.

In this case, even if the number of used times of the item possessed by the character reaches the predetermined value, it is possible that the item is changed or not changed. Thus, the progress of the game is changed unexpectedly so that the attractiveness of the game can be enhanced.

According to another aspect of the present invention, there is provided a method of playing a video game wherein a character is capable of possessing an item which causes a change in progress of the video game, the method comprising a first step for updating the number of used times of one of items possessed by the character when the one of the items is used in response to an operation inputted by a player; a second step for judging whether the number of used times of the one of the items updated at the first step reaches the number of preset using times of the one of the items; and a third step for changing the one of the items to a different item which is stored in advance corresponding to the one of the items.

In the foregoing method, it may be arranged that the game realizes a battle between the character and another character, and that the third step changes the one of the items to the different item after the battle is finished.

It may be arranged that the foregoing method further comprises a guidance display step for causing a guidance to be displayed when the third step changes the one of the items to the different item, the guidance notifying a change of the one of the items to the different item.

It may be further arranged that the third step determines whether to change the one of the items to the different item in accordance with a preset probability value.

By using a computer to execute the foregoing steps, the same effects can be achieved as those achieved by the foregoing video game apparatus.

According to another aspect of the present invention, there is provided a computer-readable storage medium storing a program for causing a computer to execute a video game wherein a character is capable of possessing an item which causes a change in progress of the video game, the program comprising a first step for updating the number of used times of one of items possessed by the character when the one of the items is used in response to an operation inputted by a player; a second step for judging whether the number of used times of the one of the items updated at the first step reaches the number of preset using times of the one of the items; and a third step for changing the one of the items to a different item which is stored in advance corresponding to the one of the items.

In the foregoing computer-readable storage medium, it may be arranged that the game realizes a battle between the character and another character, and wherein the third step changes the one of the items to the different item after the battle is finished.

It may be arranged that the program further comprises a guidance display step for causing a guidance to be displayed when the third step changes the one of the items to the different item, the guidance notifying a change of the one of the items to the different item.

It may be further arranged that the third step determines whether to change the one of the items to the different item in accordance with a preset probability value.

By causing the computer to read the program stored in the storage medium, the foregoing video game apparatus can be realized. Accordingly, the storage medium can be distributed and sold as a software product independently of the hardware.

The foregoing program may be embodied in a carrier wave as a computer data signal, so as to be electronically distributed and sold via a network or the like as a software product independently of the hardware.

Specifically, the computer data signal is embodied in a carrier wave and includes a program for causing a computer to execute a video game wherein a character is capable of possessing an item which causes a change in progress of the video game, the computer data signal comprising a first step for updating the number of used times of one of items possessed by the character when the one of the items is used in response to an operation inputted by a player; a second step for judging whether the number of used times of the one of the items updated at the first step reaches the number of preset using times of the one of the items; and a third step for changing the one of the items to a different item which is stored in advance corresponding to the one of the items.

BRIEF DESCRIPTION OF THE DRAWINGS

The present invention will be understood more fully from the detailed description given hereinbelow, taken in conjunction with the accompanying drawings.

In the drawings:

FIG. 3 is a schematic view showing an item storing table;

FIG. 4 is a schematic view showing an item change control table according to a first preferred embodiment of the present invention;

FIG. 10 is a schematic view showing an item change control table according to a second preferred embodiment of the present invention.

DESCRIPTION OF THE PREFERRED EMBODIMENTS

Now, preferred embodiments of the present invention will be described hereinbelow with reference to the accompanying drawings.

First Embodiment

Figure 1:
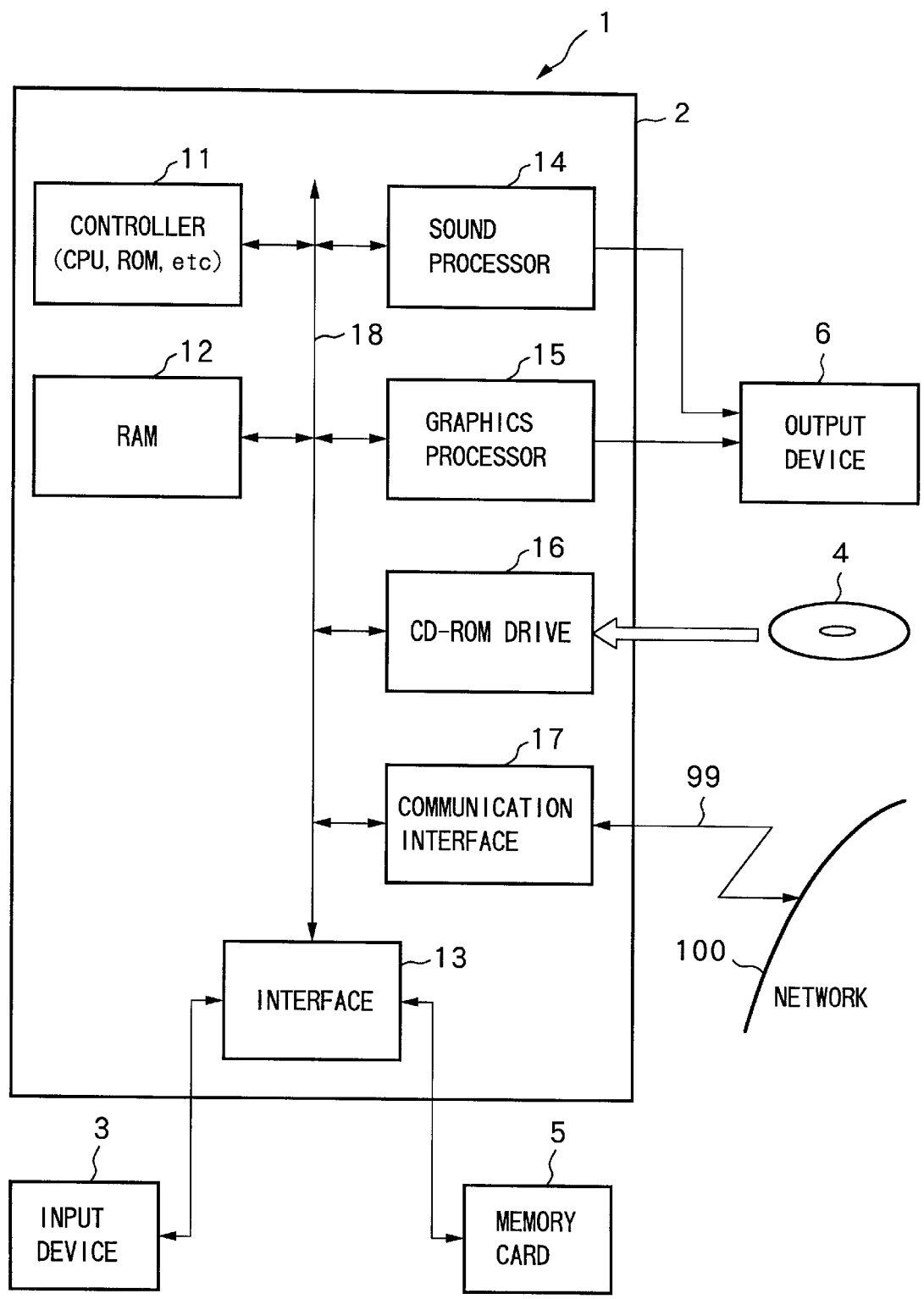
FIG. 1 is a block diagram showing the whole configuration of a video game apparatus to which the present invention is applied.

FIG. 1 is a block diagram showing a configuration of a video game apparatus 1 according to the first preferred embodiment of the present invention. As shown in FIG. 1, the video game apparatus 1 comprises a body 2, an input device 3, a memory card 5, a CD-ROM 4 and an output device 6, for example.

The body 2 of video game apparatus 1 comprises, for example, a controller 11, a RAM (random access memory) 12, an interface 13, a sound processor 14, a graphics processor 15, a CD-ROM (compact disk read only memory) drive 16 and a communication interface 17, which are mutually connected to each other via a bus 18. The CD-ROM 4 is loaded into and unloaded from the CD-ROM drive 16.

The controller 11 includes a CPU (central processing unit) and a ROM (read only memory) storing basic programs such as a boot program and an OS (operating system). The controller 11 executes a program stored in the RAM 12 so as to implement processing for controlling the progress of a game. The controller 11 controls operations of the foregoing sections 12 to 17 of the body 2.

The RAM 12 is used as a main memory of the body 2. The RAM 12 stores the program and data necessary for controlling the game progress transferred from the CD-ROM 4. The RAM 12 is also used as a work area upon execution of the program. Areas allocated to the RAM 12 and data stored therein will be described later in detail.

To the interface 13, the input device 3 and the memory card 5 are detachably connected. The interface 13 controls data exchange between the exterior components, i.e. the input device 3 and the memory card 5, and the interior components, i.e. the controller 11 and the RAM 12. The input device 3 is provided with direction keys and various buttons. When a player operates those keys and buttons, commands necessary for controlling the progress of the game, such as moving commands or motion commands to the player character, are inputted. The memory card 5 is used for saving data indicative of the progress state of the game.

In response to a command from the controller 11, the sound processor 14 implements processing for reproducing sound data such as BGM (background music) and sound effect depending on the progress state of the game, and outputs a sound signal to the output device 6.

In response to a command from the controller 11, the graphics processor 15 implements three-dimensional graphic processing to produce image data according to the progress state of the game. The graphics processor 15 adds a predetermined synchronization signal to the produced image data and outputs a video signal to the output device 6.

In response to a command from the controller 11, the CD-ROM drive 16 drives the CD-ROM 4 loaded therein so as to transfer the program and data stored in the CD-ROM 4 to the RAM 12 via the bus 18.

The communication interface 17 is connected to an external network 100 via a communication cable 99 and, in response to a command from the controller 11, implements processing for data exchange with respect to the external network 100.

The CD-ROM 4 stores the program and data necessary for controlling the progress of the game. The CD-ROM 4 is driven by the CD-ROM drive 16 so that the stored program and data are read out. The program and data read from the CD-ROM 4 are transferred from the CD-ROM drive 16 to the RAM 12 via the bus 18.

The output device 6 comprises a display unit having a CRT (cathode ray tube) for displaying an image based on a video signal from the graphics processor 15, and a speaker for outputting a sound based on a sound signal from the sound processor 14. Normally, a television is used for the output device 6.

Now, the areas allocated to the RAM 12 and the data stored therein will be described in detail.

Figure 2:
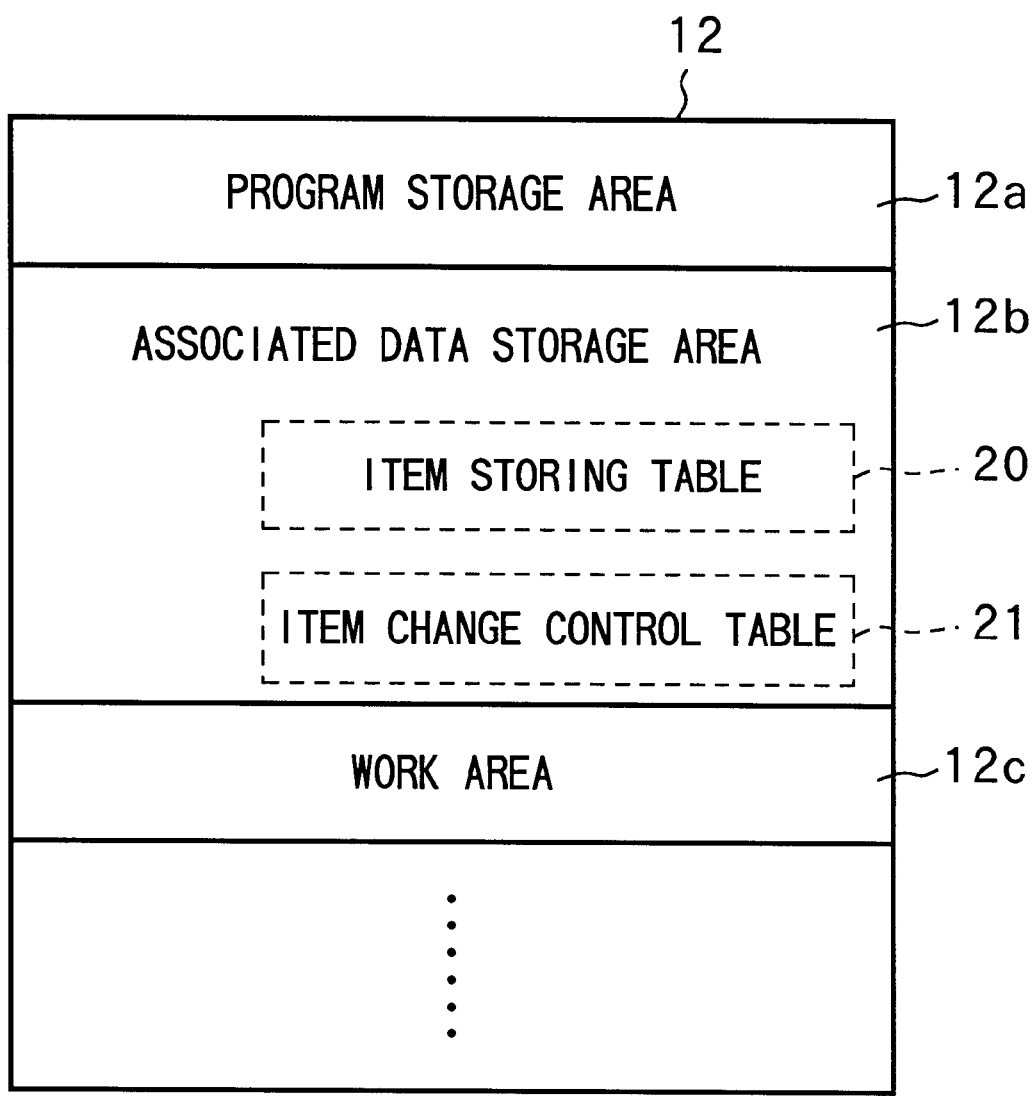
FIG. 2 is a schematic view showing areas allocated to a RAM shown in FIG. 1.

FIG. 2 is a schematic view showing the areas allocated to the RAM 12. As shown in FIG. 2, a program storage area 12a, an associated data storage area 12b and a work area 12c are allocated to the RAM 12. The program and data stored in those areas 12a to 12c are read from the CD-ROM 4 by the CD-ROM drive 16 and transferred to the RAM 12 under the control of the controller 11.

The program storage area 12a stores the program necessary for execution of the game, such as a program represented by a later-described flowchart.

The associated data storage area 12b stores items acquired by the player character during the progress of the game and various data necessary for controlling item changes. Those items and data are stored in the form of an item storing table 20 and an item change control table 21.

The work area 12c successively stores other image data and sound data which become necessary during execution of the game.

FIG. 3 is a schematic view showing the item storing table 20 stored in the associated data storage area 12b. The item storing table 20 stores data about weapons, armors and other items possessed by the player character. As shown in FIG. 3, the item storing table 20 is provided with columns 20a to 20d for "item kind", "item name", "equipment flag" and "item data", respectively.

The item kind column 20a is divided into three sections for "weapon", "armor" and "others". The item name column 20b stores item names for each of the item kinds, i.e. "weapon", "armor" and "others". The equipment flag column 20c is provided only for those items belonging to "weapon" and "armor", wherein "1" or "0" is set as a value of an equipment flag F for each of those items. The value "1" represents that the player character is equipped with a weapon or armor of the corresponding item name, while the value "0" represents otherwise.

The item data column 20d stores durability data and discipline degree data, in addition to fighting parameters representing attack power and hit rate, or defense power and evasion rate, for each of the items belonging to "weapon" and "armor". The durability is a parameter which is updated through subtraction depending on the number of times of having used an item in case of "weapon", and depending on the number of times of having received a damage to an item greater than a preset magnitude in case of "armor". The number of times of having used a weapon item represents the number of times the player character has attacked an enemy character using a weapon item which the character player is equipped with according to an operation inputted by the player. The number of times of having received a damage to an armor item represents the number of times the player character equipped with an armor item according to an operation inputted by the player has received a damage from the enemy character. On the other hand, regardless of the number of times of having used the item or having received the damage, the durability may be reduced using a particular item such as "rust card". The discipline degree is increased through combination between weapons or between armors. The combination between weapons or between armors represents that a more effective item is produced from two or more weapon or armor items designated by an operation inputted by the player.

It may also be arranged to increase the discipline degree depending on the number of times of having used an item. The discipline degree may also be increased using a particular item such as "polish card".

The item name column 20b for the section of "others" stores item names other than "weapon" or "armor" owned by the player character, and the item data column 20d for that section stores effect data and data about the number for each of those item names.

FIG. 4 is a schematic view showing the item change control table 21 stored in the associated data storage area 12b. The item change control table 21 stores information showing a correlation between each of items and a corresponding different item to which the former item is changed when its durability becomes "0". The item change control table 21 is provided with columns 21a to 21d for "item", "discipline degree", "changing item" and "effect", respectively.

The item column 21a stores those items whose durabilities can be "0", while the discipline degree column 21b stores two kinds of data defining different numerical ranges of discipline degree data with respect to each of the items stored in the item column 21a. Further, the changing item column 21c stores changing or replacing items, other than those items stored in the item column 21a, to be assigned corresponding to the foregoing two kinds of numerical ranges stored in the discipline degree column 21b, while the effect column 21d stores effects thereof.

Accordingly, when the durability of an item the player character is equipped with becomes "0", the item can be changed to either of two corresponding items depending on the discipline degree of the item at that time, by referring to the item change control table 21.

Now, the processing executed by the controller 11 in the video game apparatus 1 will be described according to the first preferred embodiment of the present invention. Upon starting up the body 2, the OS stored in the ROM and the program (game program) and data stored in the CD-ROM 4 for execution of the game are read into the areas 12a to 12c of the RAM 12 according to the boot program stored in the ROM.

Figure 5:
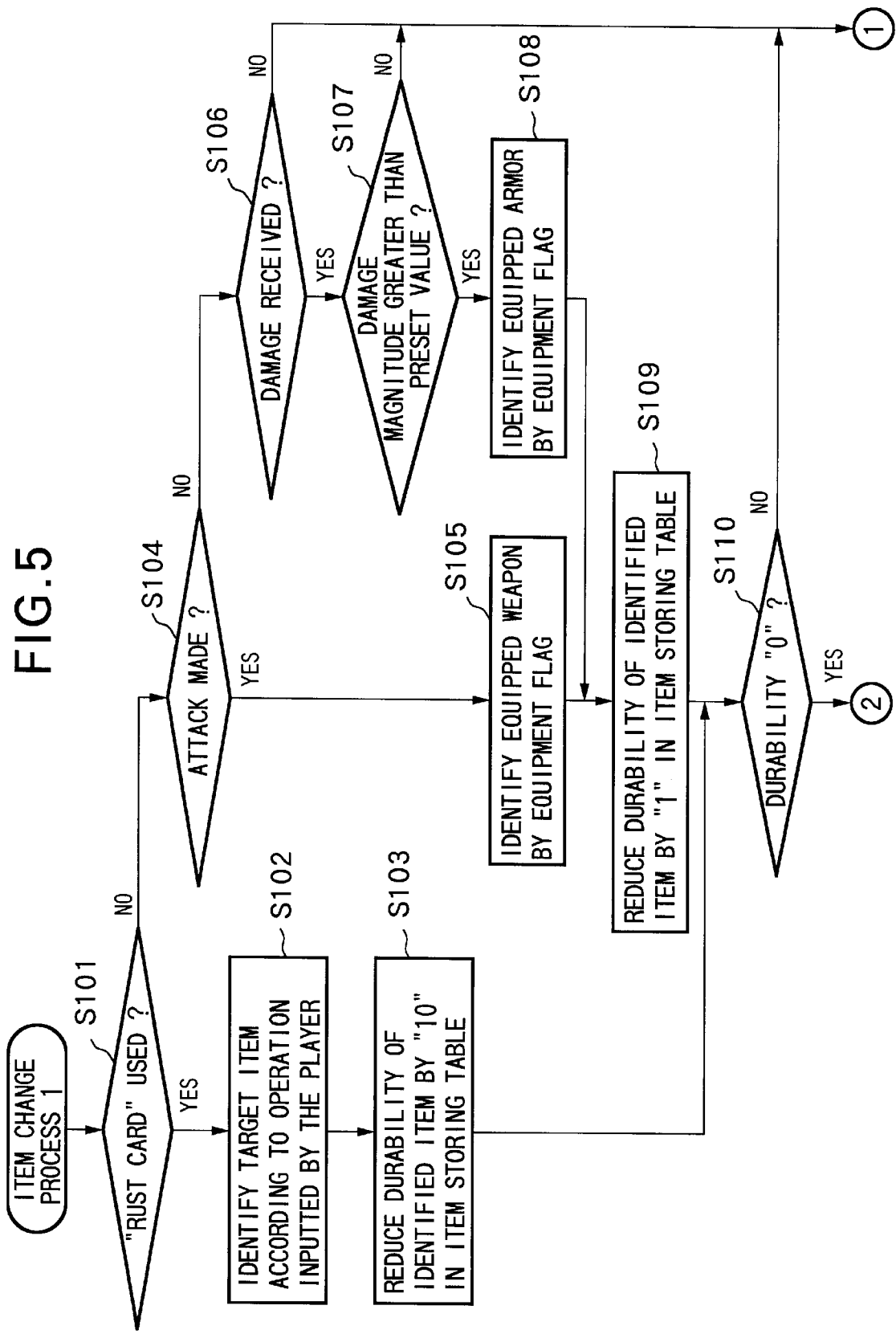
FIGS. 5 and 6 are flowcharts showing an item change process according to the first preferred embodiment of the present invention.
Figure 6:
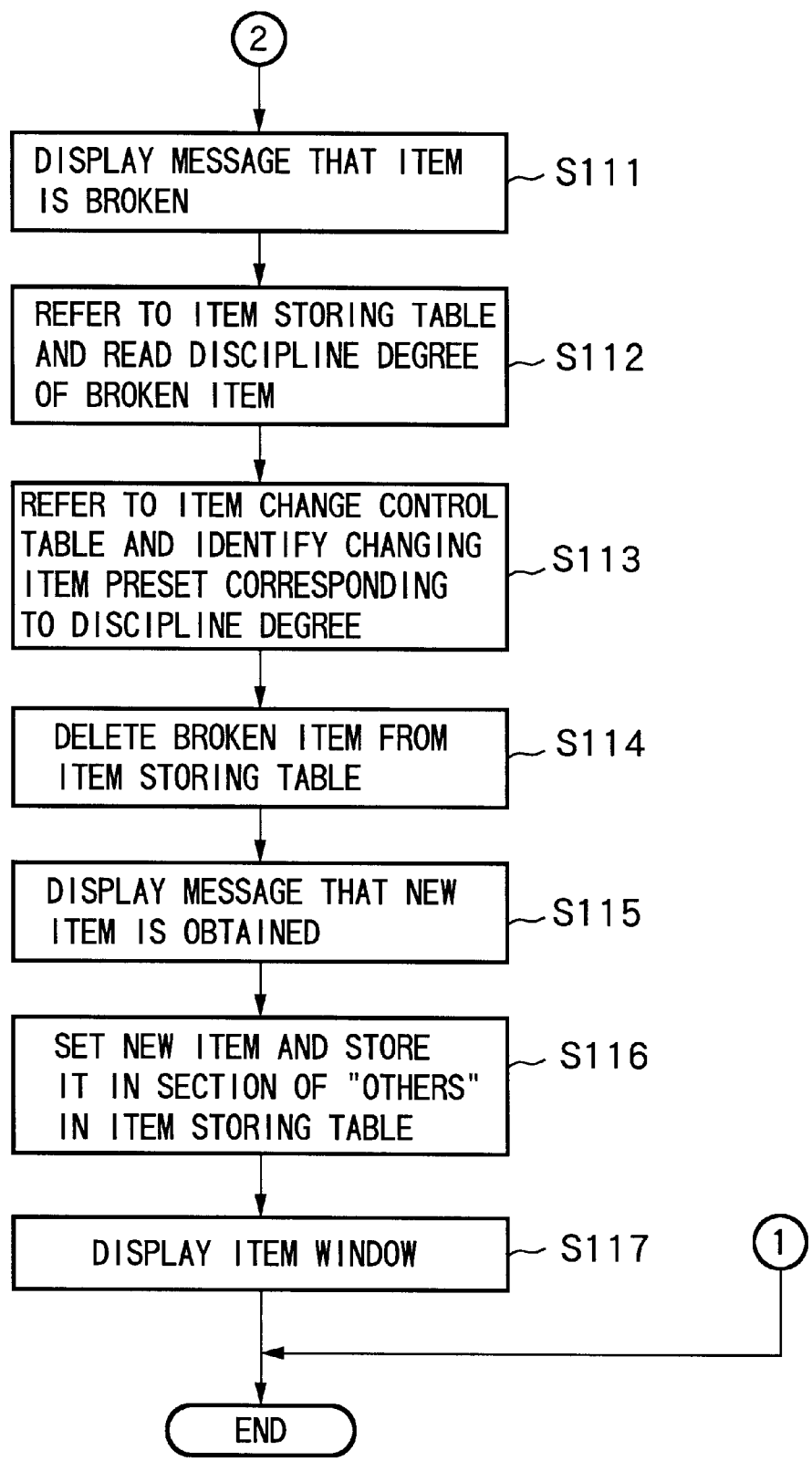

Thereafter, the processing for execution of the game is started according to the game program, wherein an item change process 1 represented by a flowchart shown in FIGS. 5 and 6 is executed per predetermined period according to timer interruption. The item change process 1 will be described hereinbelow with reference to the flowchart shown in FIGS. 5 and 6. Control operations executed in the video game apparatus 1 include those operations which are actually controlled by cooperation between the controller 11 and other circuits. However, for brevity of description, the following explanation will be given assuming that all operations relating to the controller 11 are directly controlled by the controller 11.

As shown in FIG. 5, the controller 11 first judges whether "rust card" owned by the player character is used according to an operation inputted by the player via the input device 3 (step S101). If "rust card" is used, a target item for which "rust card" is used is identified according to the operation input via the input device 3 (step S102), and the durability of the identified item is reduced by "10" in the item storing table 20 shown in FIG. 3 (step S103).

Thus, it is possible to positively lower the durability of the weapon or armor item by means of using "rust card".

On the other hand, if "rust card" is not used, the controller 11 judges whether the player character has made an attack according to an operation inputted by the player (step S104). Then, if the player character has made the attack, a weapon currently equipped by the player character is identified by means of an equipment flag F, i.e. a weapon item whose equipment flag F is set to "1" is identified in the item storing table 20 (step S105). Then, the durability of the item identified at step S105 is reduced by "1" in the item storing table 20 (step S109).

On the other hand, if the player character has not made the attack, it is judged whether the player character has received a damage (step S106). If the damage is received, it is judged whether a magnitude of the damage is greater than a preset value (step S107). If the damage magnitude is greater than the preset value, an armor currently equipped by the player character is identified by means of an equipment flag F, i.e. an armor item whose equipment flag F is set to "1" is identified in the item storing table 20 (step S108). Then, the durability of the item identified at step S108 is reduced by "1" in the item storing table 20 (step S109).

Accordingly, if a weapon the player character is equipped with is used once for attack or if the player character equipped with an armor receives once a damage which is greater than the preset magnitude, the durability of the corresponding weapon or armor item is reduced by "1". On the other hand, it may be arranged that the durability is reduced by "1" when the number of times of having made attacks or having received damages reaches a preset value. Alternatively, the durability may be updated based on the number of times of battles wherein a weapon or armor is equipped by the player character.

Then at step S110 following step S103 or S109, the controller 11 judges by referring to the durability of the identified item in the item storing table 20 whether the durability thereof becomes "0". If the durability becomes "0", there is displayed a message that the corresponding item is broken (step S111).

Figure 7:
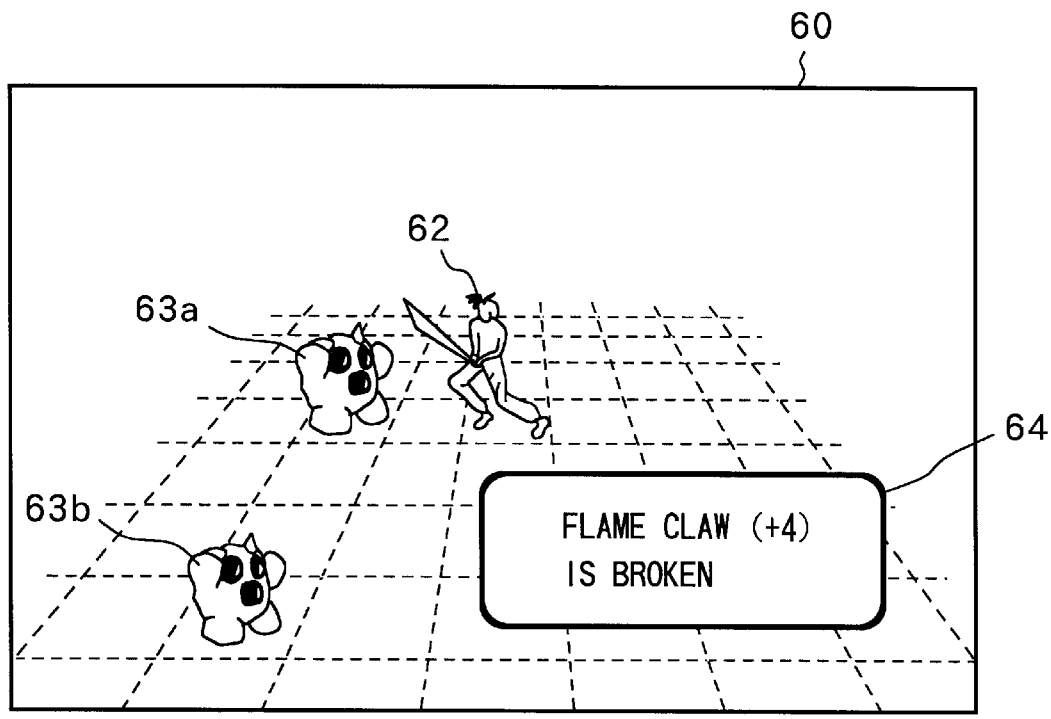
FIG. 7 is a schematic view of an example of displaying a message that a particular item is broken.

Thus, as illustrated in FIG. 7, when the durability of a weapon "flame claw" used by a player character 62 becomes "0", step S111 displays a message 64—flame claw (+4) is broken—on a display screen 60 of the display unit of the output device 6 wherein the player character 62 is fighting an enemy character 63a. In this case, the message 64 is displayed on the display screen 60 at a portion where no interference occurs with the player character 62 and the enemy characters 63a and 63b.

After displaying the message at step S111, the item storing table 20 is referred to so as to read the discipline degree of the broken item (step S112). Then, the item change control table 21 is referred to so as to identify a changing item corresponding to the discipline degree read at step S112 (step S113). Specifically, assuming that the broken item is "flame claw", if the discipline degree of "flame claw" is in the range of "+2 to +6", a changing item "fireball" is identified and, if it is "+7 or greater", a changing item "Ifleet" is identified.

Figure 8:
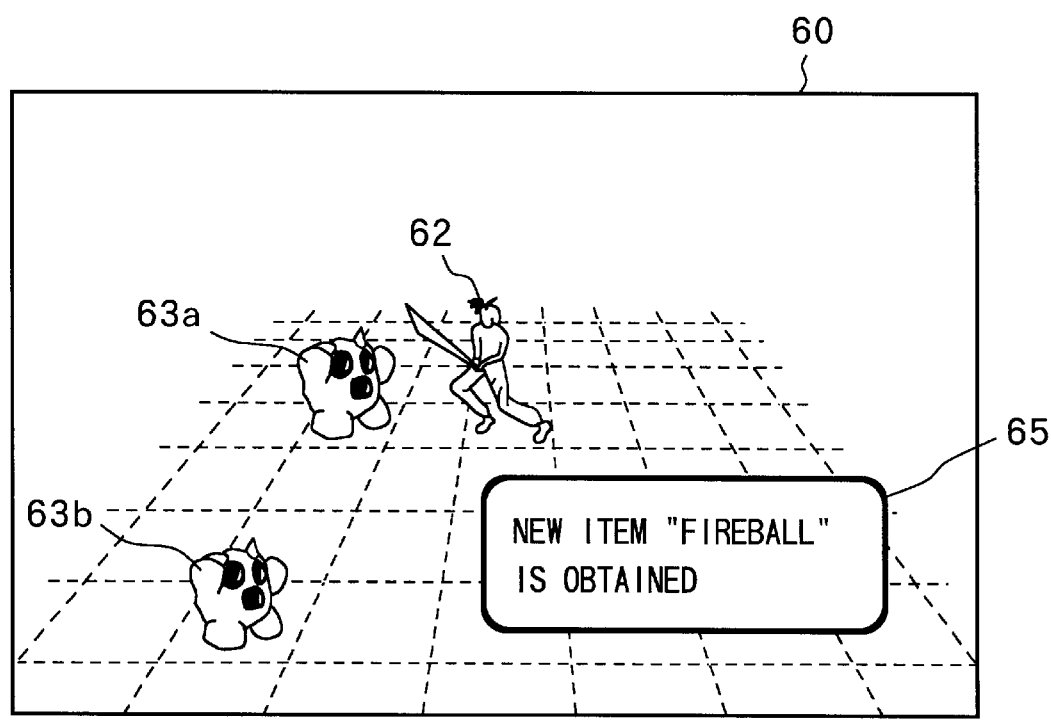
FIG. 8 is a schematic view of an example of displaying a message that a new item is obtained.

Subsequently, the broken item is deleted from the item storing table 20 (step S114), and a message is displayed that a new item is obtained (step S115). Thus, assuming that the broken item is "flame claw" and that the discipline degree of "flame claw" is in the range of "+2 to +6", step S115 displays a message 65—new item "fireball" is obtained—on the display screen 60 as illustrated in FIG. 8.

Figure 9:
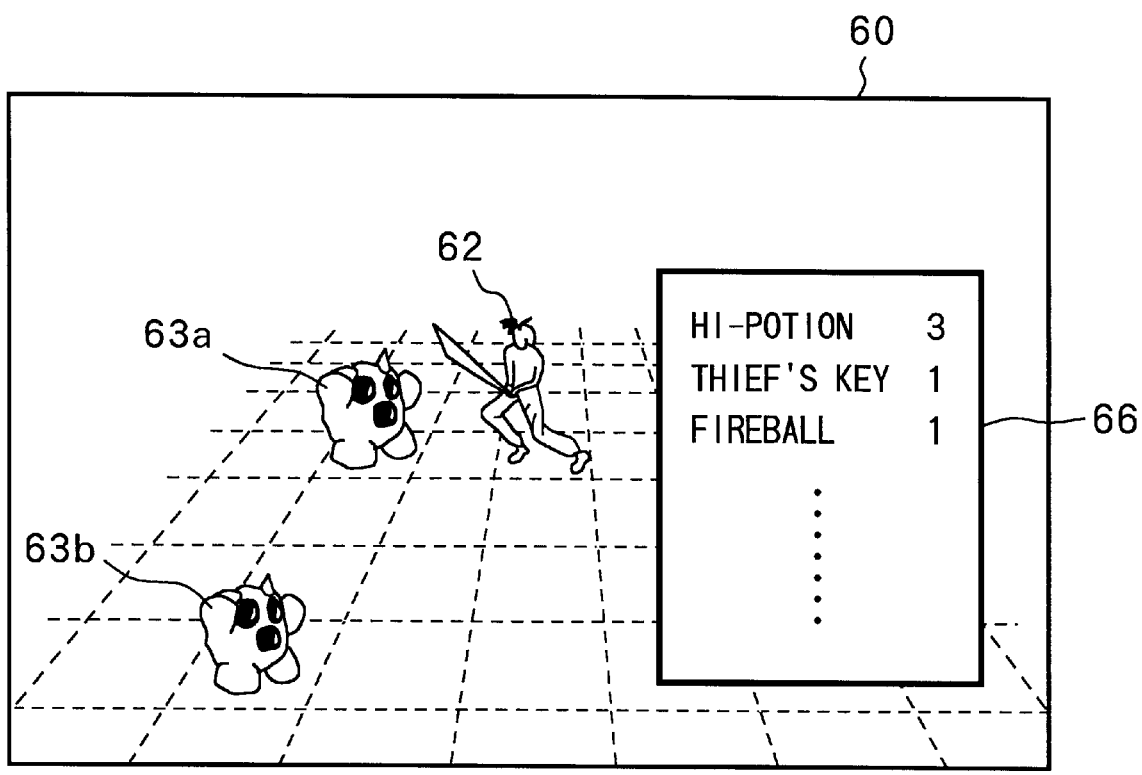
FIG. 9 is a schematic view of an example of displaying an item window wherein names of items possessed by a player character and the numbers thereof are displayed.

Then, the new item is set in place of the broken item and stored in the section of "others" in the item storing table 20 (step S116). Subsequently, an item window is displayed (step S117). Thus, as illustrated in FIG. 9, an item window 66 is displayed on the display screen 60 so that the item names and the numbers thereof stored in the section of "others" in the item storing table 20 are displayed.

As described above, in the video game apparatus according to the first preferred embodiment, when the player character makes an attack, the durability of a weapon currently equipped by the player character is reduced and, when the player character receives a damage greater than the preset magnitude, the durability of an armor currently equipped by the player character is reduced. When the durability of the weapon or armor becomes "0", the player character gets a new item depending on the discipline degree at that time and the game progresses further. Thus, a weapon or armor possessed by the player character is changed to a different item at a different time point or scene depending on a frequency of using the weapon or receiving damages during the progress of the game. This can enhance the attractiveness of the game. Since the item is changed at a different time point or scene, the progress of the game can be diversified.

Second Embodiment

The second preferred embodiment of the present invention is the same in hardware configuration of a video game apparatus as the foregoing first preferred embodiment. In the second preferred embodiment, an item change control table stored in an associated data storage area 12b of a RAM 12 and an item change process executed by the controller 11 differ from those in the first preferred embodiment.

FIG. 10 is a schematic view showing an item change control table 22 stored in the associated data storage area 12b according to the second preferred embodiment. The item change control table 22 stores items, changing items to each of which a corresponding item whose durability becomes "0" is changed, and information of probability values each representing a possibility of changing to a new item from a corresponding item whose durability becomes "0". The item change control table 22 is provided with columns 22a to 22c for "item", "changing item" and "change probability".

The item column 22a stores those items whose durabilities can be "0", while the changing item column 22b stores at least one changing or replacing item corresponding to each of the items stored in the item column 22a. The change probability column 22c stores a probability value for each of the changing items stored in the column 22b, representing a possibility of changing to the changing item stored in the column 22b from the corresponding item stored in the column 22a. Thus, by referring to the item change control table 22, a change from an item whose durability becomes "0" to a new different item is managed based on the stored change probability.

Figure 11:
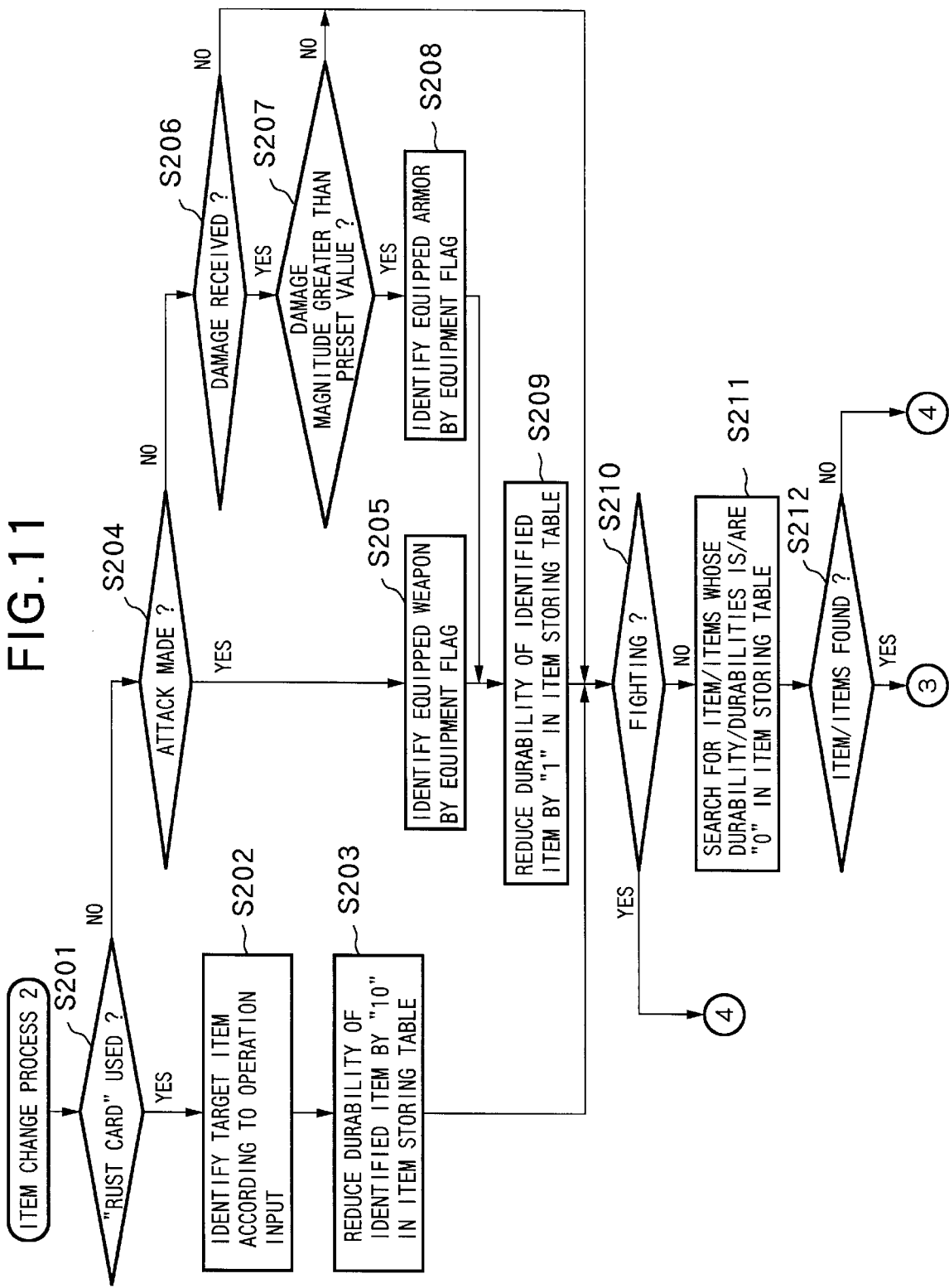
FIGS. 11 and 12 are flowcharts showing an item change process according to the second preferred embodiment of the present invention.
Figure 12:
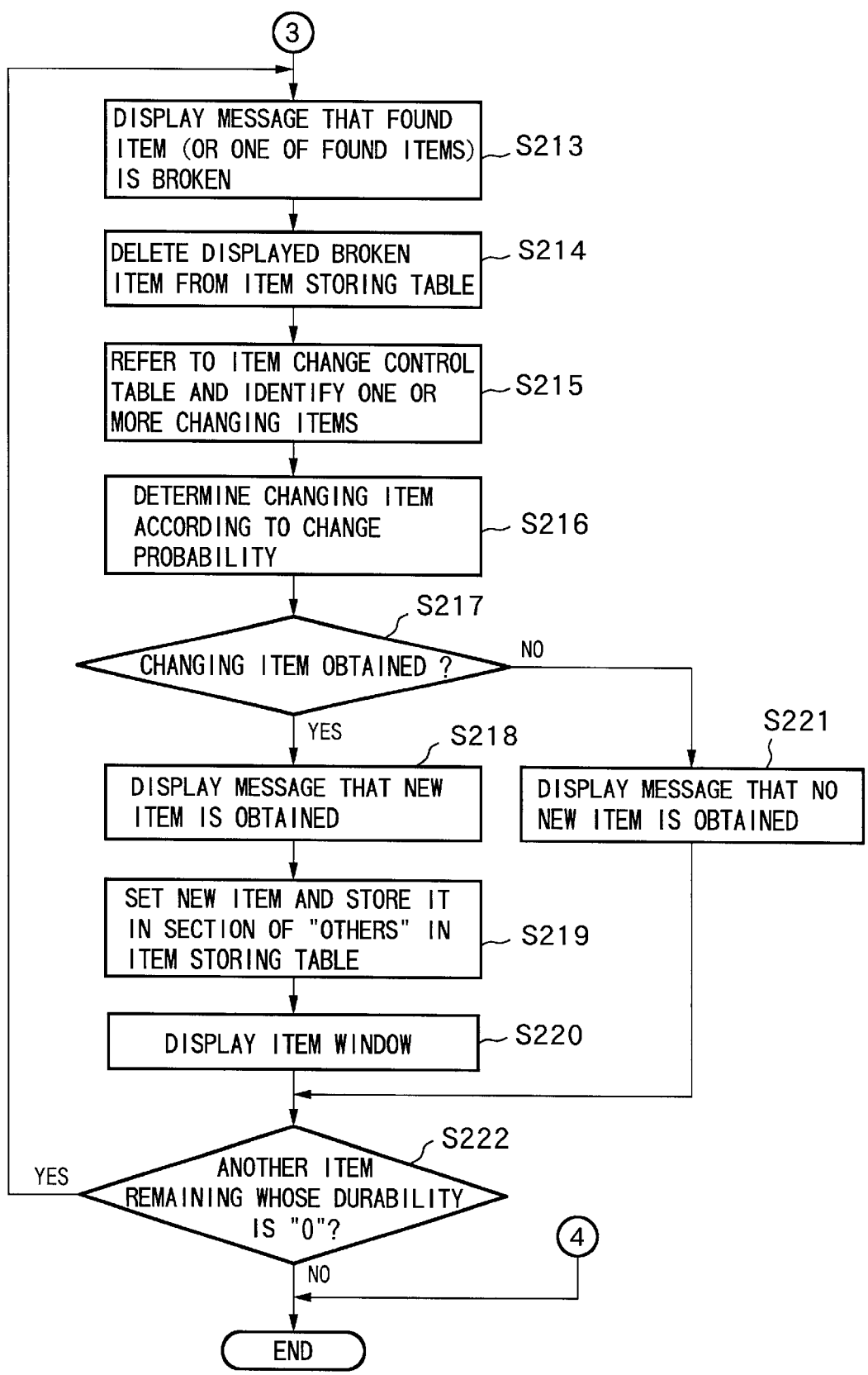

Now, the processing executed by the controller 11 in the video game apparatus 1 will be described according to the second preferred embodiment of the present invention, with reference to an item change process 2 represented by a flowchart shown in FIGS. 11 and 12. As appreciated, steps S201 to S209 shown in FIG. 11 are the same as steps S101 to S109 shown in FIG. 5 so that explanation thereof is omitted for brevity of description. That is, depending on a use of "rust card", an attack made by the player character or a reception of a damage greater than the preset magnitude, the durability of a corresponding item is reduced in the item storing table 20.

At step S210 following step S203, S206, S207 or S209, the controller 11 judges whether or not the player character is fighting. If judged to be fighting, the item change process 2 is finished. On the other hand, if not fighting or if the fighting is finished, one or more items whose durabilities are "0" are searched for in the item storing table 20 (step S211). Then, it is judged whether there exist one or more items whose durabilities become "0" based on a result of the search implemented at step S211 (step S212). If no item is found at step S212, the item change process 2 is finished.

On the other hand, if such one or more items are found at step S212, there is displayed a message that the found item (or one of the found items) is broken (step S213). Then, the displayed broken item is deleted from the item storing table 20 (step S214).

Subsequently, by referring to the item change control table 22, one or more changing items stored corresponding to the deleted item are identified (step S215). Specifically, if one changing item is stored corresponding to the deleted item in the item change control table 22, that changing item is identified, while if more than one changing items are stored corresponding to the deleted item, those changing items are first identified.

Then, based on one or more probability values stored in the item change control table 22 corresponding to one or more identified changing items, the changing item for replacing the former item is determined (step S216). Since the determination of the changing item is carried out according to the change probability, it is possible that "no changing item" is determined.

Then, it is judged whether there exists the changing item as determined at step S216 (step S217). If negative, there is displayed a message that no changing item is obtained (step S221). On the other hand, if affirmative, there is displayed a message that the new item is obtained (step S218).

Then, the new item is set in place of the former item and stored in the section of "others" in the item storing table 20 (step S219). Subsequently, an item window is displayed (step S220) so that the foregoing item window 66 as illustrated in FIG. 9 is displayed on the display screen 60.

Further, the controller 11 judges whether there remain one or more items whose durabilities are "0" (step S222). If affirmative, step S213 and subsequent steps are repeated until answer at step S222 becomes negative. When all the items whose durablities become "0" are subjected to the processing of steps S213 to S221, the item change process 2 is finished.

As described above, in the video game apparatus according to the second preferred embodiment, step S210 judges whether the player character is fighting or not and, after the fighting is finished, steps S211 through S222 are executed. Thus, the weapon or armor item the player character is equipped with is not changed during the battle so that the weapon or armor being used is not changed to a different item during the battle.

Further, when the durability of an item becomes "0", a change to a new different item is controlled depending on the change probability. Thus, the progress of the game is changed unexpectedly so that the attractiveness of the game can be enhanced.

In the foregoing first and second preferred embodiments, the present invention is realized using a home-use game apparatus as a platform. However, the present invention may also be realized using a personal computer or an arcade game apparatus as a platform.

In the foregoing first and second preferred embodiments, the program and data for realizing the present invention are stored in a CD-ROM, and the CD-ROM is used as a storage medium. However, a storage medium is not limited to a CD-ROM, but may be a computer-readable magnetic or optical storage medium or semiconductor memory other than the CD-ROM. Further, the program and data for realizing the present invention may be preinstalled in a storage of a game apparatus or computer.

The program and data for realizing the present invention may be downloaded from another device on the network 100 connected via the communication cable 99, using the communication interface 17 shown in FIG. 1. On the other hand, the program and data for realizing the present invention may be stored in a storage of another device on the communication cable 99 and transferred to the RAM 12 via the communication interface 17 upon using them.

Further, the program and data for realizing the present invention may be provided as a computer data signal embodied in a carrier wave from another device on the network 100. In this case, transmission of the computer data signal is requested to the device on the network 100 from the communication interface 17 via the communication cable 99 so that the transmitted computer data signal is received and stored in the RAM 12. It is possible to realize the present invention by the video game apparatus 1 using the program and data thus stored in the RAM 12.

While the present invention has been described in terms of the preferred embodiments, the invention is not to be limited thereto, but can be embodied in various ways without departing from the principle of the invention as defined in the appended claims.

What is claimed is:

1. A video game apparatus for playing a video game wherein a character is capable of possessing an item which causes a change in progress of the video game, said apparatus comprising:

first storage means for storing first items corresponding to second items, said first items each assigned the number of preset using times thereof by the character;

second storage means for storing the number of used times of each of said first items possessed by the character;

updating means for updating the number of used times of one of said first items possessed by the character stored in said second storage means when said one of said first items is used in response to an operation inputted by a player;

judging means for judging whether the number of used times of said one of said first items updated by said updating means reaches said number of preset using times of said one of said first items; and changing means for changing said one of said first items to corresponding one of said second items stored in said first storage means when said judging means judges that the number of used times of said one of said first items reaches said number of preset using times of said one of said first items.

2. The video game apparatus according to claim 1, wherein said game realizes a battle between said character and another character, and wherein said changing means changes said one of said first items to the corresponding one of said second items after the battle is finished.

3. The video game apparatus according to claim 1, further comprising guidance display means which causes a guidance to be displayed when said changing means changes said one of said first items to the corresponding one of said second items, said guidance notifying a change of said one of said first items to the corresponding one of said second items.

4. The video game apparatus according to claim 1, wherein said changing means determines whether to change said one of said first items to the corresponding one of said second items in accordance with a preset probability value.

5. A method of playing a video game wherein a character is capable of possessing an item which causes a change in progress of the video game, said method comprising:

a first step for updating the number of used times of one of items possessed by the character when said one of said items is used in response to an operation inputted by a player;

a second step for judging whether the number of used times of said one of said items updated at said first step reaches the number of preset using times of said one of said items; and a third step for changing said one of said items to a different item which is stored in advance corresponding to said one of said items.

6. The method according to claim 5, wherein said game realizes a battle between said character and another character, and wherein said third step changes said one of said items to said different item after the battle is finished.

7. The method according to claim 5, further comprising a guidance display step for causing a guidance to be displayed when said third step changes said one of said items to said different item, said guidance notifying a change of said one of said items to said different item.

8. The method according to claim 5, wherein said third step determines whether to change said one of said items to said different item in accordance with a preset probability value.

9. A computer-readable storage medium storing a program for causing a computer to execute a video game wherein a character is capable of possessing an item which causes a change in progress of the video game, said program comprising:

a first step for updating the number of used times of one of items possessed by the character when said one of said items is used in response to an operation inputted by a player;

a second step for judging whether the number of used times of said one of said items updated at said first step reaches the number of preset using times of said one of said items; and a third step for changing said one of said items to a different item which is stored in advance corresponding to said one of said items.

10. The computer-readable storage medium according to claim 9, wherein said game realizes a battle between said character and another character, and wherein said third step changes said one of said items to said different item after the battle is finished.

11. The computer-readable storage medium according to claim 9, wherein said program further comprises a guidance display step for causing a guidance to be displayed when said third step changes said one of said items to said different item, said guidance notifying a change of said one of said items to said different item.

12. The computer-readable storage medium according to claim 9, wherein said third step determines whether to change said one of said items to said different item in accordance with a preset probability value.

13. A computer data signal embodied in a carrier wave and including a program for causing a computer to execute a video game wherein a character is capable of possessing an item which causes a change in progress of the video game, said computer data signal comprising:

a first step for updating the number of used times of one of items possessed by the character when said one of said items is used in response to an operation inputted by a player;

a second step for judging whether the number of used times of said one of said items updated at said first step reaches the number of preset using times of said one of said items; and a third step for changing said one of said items to a different item which is stored in advance corresponding to said one of said items.

* * * * *